(12) United States Patent
Bell et al.

(10) Patent No.: US 7,687,780 B2
(45) Date of Patent: Mar. 30, 2010

(54) SEMICONDUCTOR RADIATION DETECTOR

(75) Inventors: Zane W. Bell, Oak Ridge, TN (US); Arnold Burger, Knoxville, TN (US)

(73) Assignees: Babcock & Wilcox Technical Services Y-12, LLC, Oak Ridge, TN (US); Fisk University, Nashville, TN (US)

( * ) Notice: Subject to any disclaimer, the term of this patent is extended or adjusted under 35 U.S.C. 154(b) by 0 days.

(21) Appl. No.: 11/248,943

(22) Filed: Oct. 11, 2005

(65) Prior Publication Data
US 2007/0080301 A1    Apr. 12, 2007

(51) Int. Cl.
*G01T 1/16* (2006.01)

(52) U.S. Cl. ............... 250/370.12; 250/370.09; 257/428; 257/430

(58) Field of Classification Search ... 250/269.3–269.6, 250/370.05, 370.09, 370.12; 257/428, 430
See application file for complete search history.

(56) References Cited

U.S. PATENT DOCUMENTS

| | | | | |
|---|---|---|---|---|
| 3,636,354 A | * | 1/1972 | Leheny et al. | 250/352 |
| 3,922,553 A | * | 11/1975 | Bachmann et al. | 250/370.12 |
| 4,445,036 A | * | 4/1984 | Selph | 250/370.05 |
| 4,602,352 A | * | 7/1986 | Coon et al. | 365/114 |
| 4,937,454 A | * | 6/1990 | Itoh et al. | 250/370.11 |
| 5,117,114 A | * | 5/1992 | Street et al. | 250/370.11 |
| 5,445,847 A | * | 8/1995 | Wada et al. | 427/74 |
| 5,510,644 A | * | 4/1996 | Harris et al. | 257/458 |
| 5,889,313 A | * | 3/1999 | Parker | 257/429 |
| 6,388,260 B1 | * | 5/2002 | Doty et al. | 250/390.01 |
| 6,479,826 B1 | * | 11/2002 | Klann et al. | 250/370.05 |
| 6,862,549 B1 | * | 3/2005 | Palfenier et al. | 702/134 |

OTHER PUBLICATIONS

Uptal N. R., M. Groza, Y. Cui, A. Burger, Z. W. Bell and D. A. Carpenter. "Crystal Growth, Characterization and Fabrication of AgGaSe2 Crystals as a Novel Material for Room-Temperature Radiation Detectors." Proc. SPIE 5540 (2004): 177-80.*
Owens, Alan and A. Peacock, "Compound Semiconductor Radiation Detectors," Nuclear Instruments & Methods in Physics Research Section A, 2004, pp. 18-37, vol. 531, Elsevier.

* cited by examiner

*Primary Examiner*—David P Porta
*Assistant Examiner*—Casey Bryant
(74) *Attorney, Agent, or Firm*—D. Neil LaHaye; Michael J. Renner

(57) ABSTRACT

A semiconductor detector for ionizing electromagnetic radiation, neutrons, and energetic charged particles. The detecting element is comprised of a compound having the composition I-III-VI$_2$ or II-IV-V$_2$ where the "I" component is from column 1A or 1B of the periodic table, the "II" component is from column 2B, the "III" component is from column 3A, the "IV" component is from column 4A, the "V" component is from column 5A, and the "VI" component is from column 6A. The detecting element detects ionizing radiation by generating a signal proportional to the energy deposited in the element, and detects neutrons by virtue of the ionizing radiation emitted by one or more of the constituent materials subsequent to capture. The detector may contain more than one neutron-sensitive component.

30 Claims, 3 Drawing Sheets

SEMICONDUCTOR RADIATION DETECTOR

GOVERNMENT RIGHTS

The U.S. Government has rights to this invention pursuant to contract number DE-AC05-00OR22800 between the U.S. Department of Energy and Babcock & Wilcox Technical Services.

BACKGROUND OF THE INVENTION

1. Field of the Invention

The invention is generally related to radiation detection and more particularly to a semiconductor detector of ionizing electromagnetic radiation, neutrons, and energetic charged particles.

2. General Background

The present state of the art in semiconductor radiation detection is silicon diodes, high purity germanium (cooled by liquid nitrogen), and compound semiconductors such as cadmium zinc telluride (CZT), and mercuric iodide. Each of these materials has one or more drawbacks regarding its use. Silicon has a low atomic number and is therefore primarily useful for the detection of charged particles and atomic x rays emitted from low atomic number elements. Germanium has a higher atomic number but, because of its low band gap energy, must be cooled by liquid nitrogen in a bulky, expensive, and possibly dangerous cryogenic system to reduce thermally generated noise. Compound semiconductors such as CZT and mercuric iodide have sufficiently high band gap to be useful at or near room temperature. However, CZT has been plagued by production problems resulting in polycrystalline ingots with twins, inclusions, and grain boundary defects. These defects can never be completely removed and are a consequence of CZT being a solid solution rather than a true compound. The result is that spectroscopy-grade crystals must be mined from bulk material. Mercuric iodide suffers from low carrier mobility, short carrier lifetime, space charge polarization, and surface degradation. In addition, mercuric iodide is an extremely soft material that is easily damaged by the slight pressure of an electrical connection and by temperatures over sixty degrees Celsius.

SUMMARY OF THE INVENTION

The invention addresses the shortcomings in the known art. What is provided is a semiconductor detector of ionizing electromagnetic radiation, neutrons, and energetic charged particles. The detecting element is comprised of a compound having the composition $I-III-VI_2$ or $II-IV-V_2$ where the "I" component is from column 1A or 1B of the periodic table, the "II" component is from column 2B, the "III" component is from column 3A, the "IV" component is from column 4A, the "V" component is from column 5A, and the "VI" component is from column 6A. The detecting element detects ionizing radiation by generating a signal proportional to the energy deposited in the element, and detects neutrons by virtue of the ionizing radiation emitted by one or more of the constituent materials subsequent to capture. The detector may contain more than one neutron-sensitive component.

BRIEF DESCRIPTION OF THE DRAWINGS

For a further understanding of the nature and objects of the present invention reference should be made to the following description, taken in conjunction with the accompanying drawing in which like parts are given like reference numerals, and wherein.

DETAILED DESCRIPTION OF THE PREFERRED EMBODIMENT

The detecting element is comprised of a compound having the composition $I-III-VI_2$ or $II-IV-V_2$ where the "I" component is from column 1A or 1B of the periodic table, the "II" component is from column 2B, the "III" component is from column 3A, the "IV" component is from column 4A, the "V" component is from column 5A, and the "VI" component is from column 6A. A more concise manner of description is that the crystal is formed from elements in the group of 1A-3A-6A, 1B-3A-6A or 2B-4A-5A of the periodic chart. An example from group 1A-3A-6A is Lithium-Gallium-Selenium. An example from group 1B-3A-6A is Copper-Gallium-Selenium. An example from group 2B-4A-5A is Cadmium-Germanium-Antimony. Crystals formed from groups 1B-3A-6A and 2B-4A-5A are chalcopyrites. The detecting element detects ionizing radiation by generating a signal proportional to the energy deposited in the element, and detects neutrons by virtue of the ionizing radiation emitted by one or more constituent materials subsequent to capture. The detector may contain more than one neutron-sensitive element.

Figure 1:
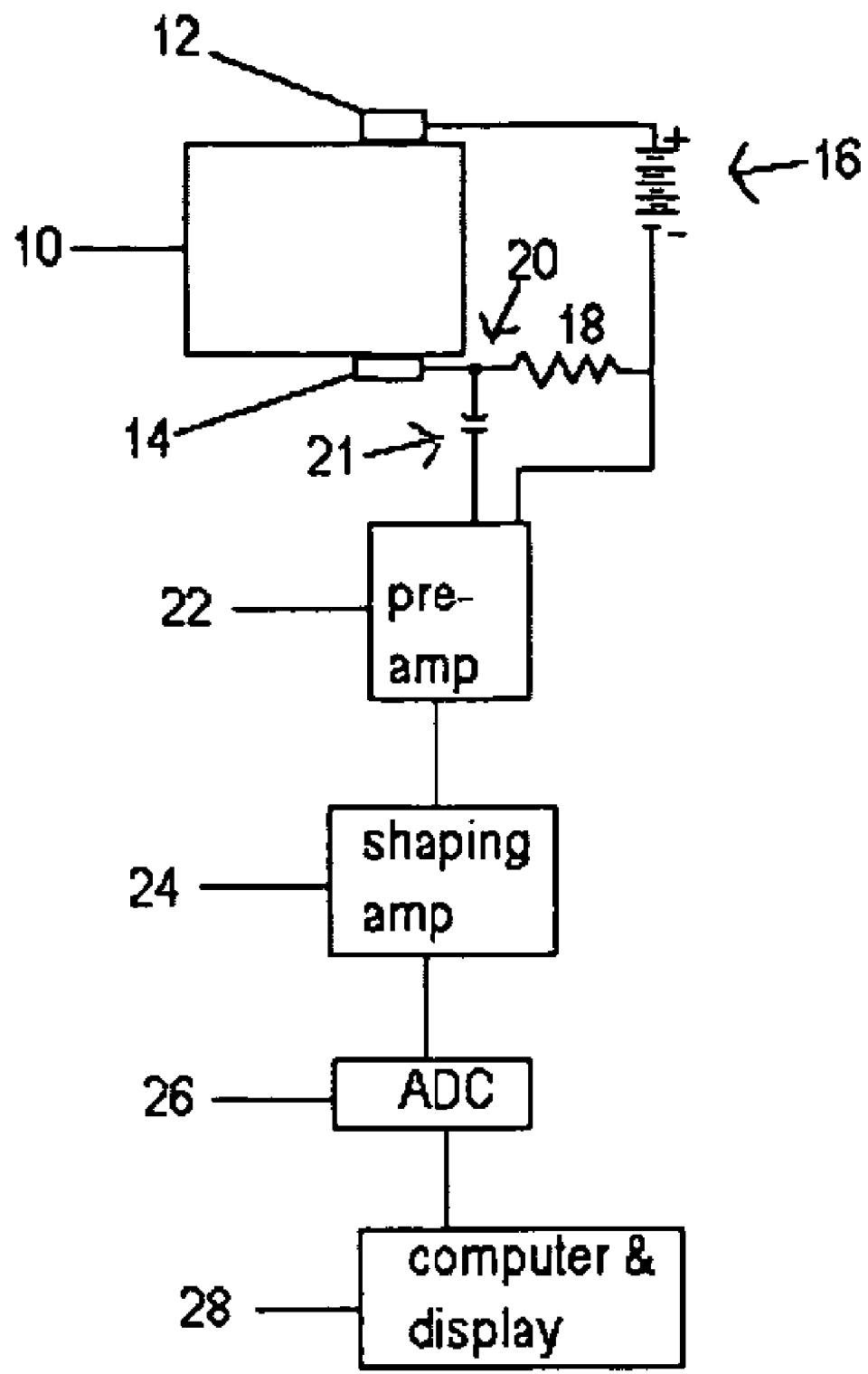
FIG. 1 is a schematic illustration of the invention.

As seen in FIG. 1, the invention is generally comprised of a semiconductor crystal 10 onto which conducting electrodes 12 and 14 have been deposited on opposing surfaces of the crystal 10. The semiconductor material may be intrinsic material or doped to produce intrinsic material. Intrinsic material, when referring to semiconductors, refers to a semiconductor material in which the majority and minority charge carriers in the material are balanced and the material does not display either negative (n-) or positive (p-) type conductivity. Doping is the process of introducing small amounts of impurities (typically in the amount of ppm, parts per million) for the purpose of altering the electrical properties of the material to force a desired density of positive and negative charge carriers. The electrical contacts may be ohmic or may be Schottky. An ohmic contact is a metal-semiconductor contact with very low resistance independent of the polarity of the applied voltage. A Schottky contact is a metal-semiconductor contact used to form a potential barrier. The resulting detecting element forms a p-n, or p-i-n diode, or simply a bulk semiconducting material. A p-i-n diode is a semiconductor structure comprised of p- and n-type materials with an intrinsic material in between. The addition of the intrinsic layer changes the properties of the p-n junction.

In the preferred embodiment, a voltage is applied between the electrodes 12 and 14 by a suitable means such as a battery 16. A resistor 18 is provided in line between one of the electrodes and the battery 16 (voltage source). Any signal generated in response to radiation is extracted through a junction 20 between the crystal 10 and the resistor 18. If the detecting element is simply bulk semiconducting material, then the polarity of the voltage with respect to the resistor is of no consequence. Although FIG. 1 shows the resistor 18 connected between the negative terminal of battery 16 and crystal 10, the resistor may be connected between the positive terminal and the crystal with the signal taken from the junction between the resistor and the crystal. If the crystal is realized as a diode (p-n, p-i-n, or Schottky), then the connection must be such that the diode is reverse biased by the battery.

When the crystal is exposed to ionizing radiation, electron-hole pairs are created in the bulk of the material. These charges are separated by the applied voltage and the resulting charge pulse is sensed as a current pulse or a voltage pulse. The amplitude of the charge pulse is proportional to the energy deposited in the crystal by the radiation. In this mode, the crystal realizes a detector of alpha, beta, gamma, and x radiation, in addition to cosmic rays.

In one arrangement, the crystal may be fabricated with one element that reacts with neutrons and subsequently emits ionizing radiation. The crystal then also serves to detect neutrons. For example, if the "I" element is silver (Ag), an element from column 1B of the periodic table, then exposure to neutrons results in transmutation of the silver nuclei to radioisotopes with short half-lives. These isotopes decay by the emission of beta particles (electrons), which will create ionization in the detector just as would radiation originating outside the detecting element. Analysis of the spectrum of pulse amplitudes and the temporal behavior of the count rate yields a signature of the presence of neutrons.

In another arrangement, if the "I" element is lithium, an element from column 1A of the periodic table, then exposure to neutrons results in the exothermic reaction $^6Li(n,\alpha)^3H$. The energetic triton and alpha particle liberate charge as they decelerate, ultimately depositing their entire energy in the crystal. Analysis of the resulting spectrum of pulse amplitudes yields a signature of the presence of neutrons.

In another arrangement, if the "III" (3A) element of the crystal is indium (In), behavior similar to that described for silver will be observed. In another arrangement, more than one element may be neutron-sensitive. For example, if both silver and indium are used, then multiple half-lives will be observed in the count rate, and spectra of beta particles characteristic of both elements will be observed in the pulse-height spectrum. Analysis of such data can give information on the spectral characteristics of the incident neutron flux.

In operation, the semiconductor radiation detecting apparatus works in the following manner. Means is provided to convert current or charge pulses to a digital value. The electrical charge signal generated in response to radiation passes from the junction 20 through a capacitor 21 to a charge-integrating pre-amplifier 22 whose output signal, in turn, is directed to a shaping amplifier 24. The shaping amplifier 24 produces an approximately Gaussian-shaped pulse. The pulse is directed to an analog-to-digital converter (ADC) 26 which translates the analog voltage developed by the shaping amplifier 24 into a digital value. The digital values from the converter 26 are directed to a computer and display 28. The computer records the number of times each value occurs during a measurement. This accumulates a histogram of the magnitudes of the pulses produced by the incident radiation. The computer compares these values to known values and provides an indication of the incident radiation based on the comparison. The use of the amplifiers, converter, and computer to condition signals and create an indication of the incident radiation is well known in the industry and does not require detailed explanation.

Figure 2:
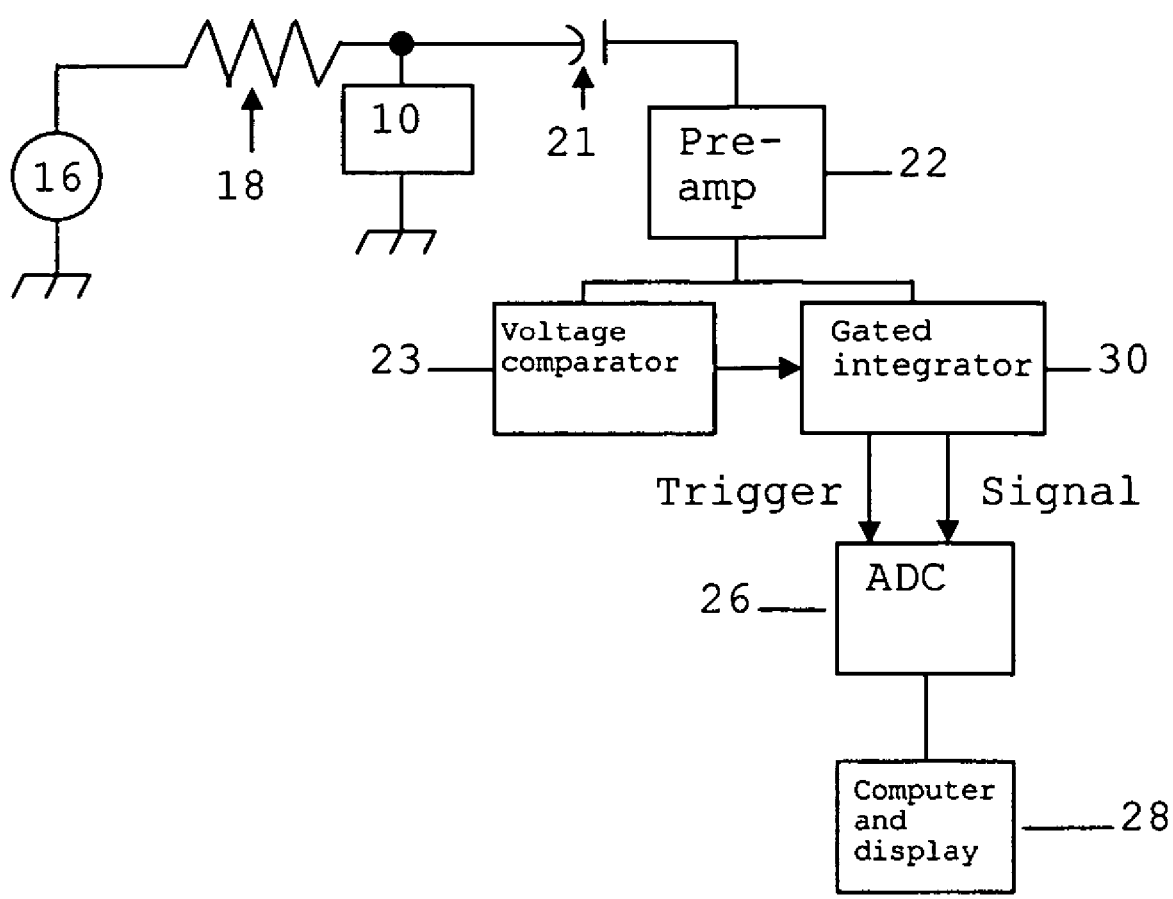
FIG. 2 is a schematic illustration of an alternate embodiment of the invention.

In an alternate embodiment, illustrated in FIG. 2, the pre-amplifier 22 simply provides gain without integration and the shaping amplifier 24 is replaced by a voltage comparator 23 and gated integrator 30. The voltage comparator triggers the gated integrator 30 to integrate the voltage pulse from the pre-amplifier. The gated integrator 30 signals the analog-to-digital converter 26 to perform a conversion when the integration period is complete. The computer and display 28 perform the same functions as described above.

Figure 3:
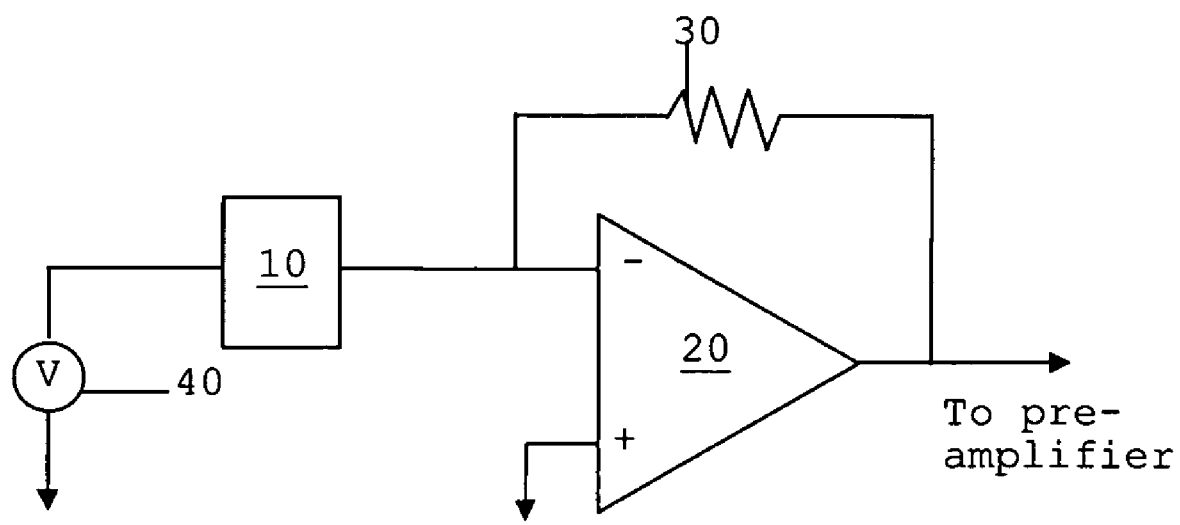
FIG. 3 is a schematic illustration of another alternate embodiment of the invention.

In another alternate embodiment, illustrated in FIG. 3, a battery 40 supplies bias to crystal 10. The charge generated by incident radiation in the crystal is separated by the potential developed by the virtual ground at the inverting terminal of operational amplifier 20, and the resulting current pulse is forced through feedback resistor 30. In this manner, the current pulse is converted to a voltage pulse and is then directed to the pre-amplifier as shown in FIG. 3.

These crystals are useful as radiation detectors, as semiconductors, for the following reasons. Carrier mobility in the range of 500-10,000 $cm^2/V$-s has been reported and band gaps between 1.2 and 2.7 eV have been produced. These values are comparable to or better than those of germanium and indicate that performance at room temperature should exceed that of CZT. In addition, some of the constituent materials have high neutron absorption cross sections, conferring simultaneous sensitivity to ionizing radiation and neutrons.

There are a number of advantages to using chalcopyrites. There is a ready availability of high-purity, oriented, crack-free, single chalcopyrite crystals produced for use in optical applications. These crystals are used in infrared non-linear optical equipment to effect second-harmonic generation or optical parametric oscillation. The finished materials have improved properties that should continue to improve as a result of research and development spurred by the interest of the military in using chalcopyrites in high-powered lasers. Chalcopyrites have physical properties that permit their use as semiconductor radiation detectors at room temperature. As such, they operate according to the same physics as do silicon, cadmium zinc telluride, and mercuric iodide. However, they differ from these materials in that the average atomic number is much larger than silicon, making them useful at higher energies than silicon. They can be grown in large, crack-free single crystal boules (unlike cadmium zinc telluride and mercuric iodide). They also are an improvement over mercuric iodide in that the use of mercuric iodide is limited to applications in which the temperature does not exceed 80 degrees Celsius, while chalcopyrites can withstand temperatures up to several hundred degrees Celsius.

The inventors are not aware of prior work with the crystals from group 1A-3A-6A or chalcopyrites as radiation detectors. Both types of crystals have been most typically used as optical elements in laser-based equipment and as photovoltaic cells.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense. For example, it may be advantageous to deposit more than two electrodes onto the crystal to control the shape of the internal electric field. In another example, sandwiching the crystal between spring-loaded contacts enables the application of a voltage without deposition of electrodes. In yet another example, the pre-amplifier, shaping amplifier, and analog-to-digital converter of FIG. 1 may be replaced by a charge-to-digital converter.

What is claimed as invention is:

1. A semiconductor ionizing radiation detecting element, comprising:

a. an ionizing electromagnetic radiation, neutron, and energetic charged particle detecting crystal, fitted with electrodes, with a voltage applied between the electrodes; and b. the crystal being formed from elements in the group consisting of 1A-3A-Selenium and 1B-3A-Selenium in the stoichiometry I-III-VI$_2$ of the periodic table.

2. The semiconductor ionizing radiation detecting element of claim 1, wherein at least one of the elements forming the crystal is neutron sensitive and emits ionizing radiation subsequent to capturing a neutron.

3. The semiconductor ionizing radiation detecting element of claim 2, wherein the conducting electrodes are ohmic.

4. The semiconductor ionizing radiation detecting element of claim 2, wherein the conducting electrodes are Schottky.

5. The semiconductor ionizing radiation detecting element of claim 2, wherein the conducting electrodes are a combination of ohmic and Schottky.

6. The semiconductor ionizing radiation detecting element of claim 2, wherein the crystal is formed as a p-n device.

7. The semiconductor ionizing radiation detecting element of claim 2, wherein the crystal is formed as a p-i-n device.

8. The semiconductor ionizing radiation detecting element of claim 2, wherein the crystal is formed as a bulk semiconductor.

9. The semiconductor ionizing radiation detecting element of claim 1, wherein the conducting electrodes are ohmic.

10. The semiconductor ionizing radiation detecting element of claim 1, wherein the conducting electrodes are Schottky.

11. The semiconductor ionizing radiation detecting element of claim 1, wherein the conducting electrodes are a combination of ohmic and Schottky.

12. The semiconductor ionizing radiation detecting element of claim 1, wherein the crystal is formed as a p-n device.

13. The semiconductor ionizing radiation detecting element of claim 1, wherein the crystal is formed as a p-i-n device.

14. The semiconductor ionizing radiation detecting element of claim 1, wherein the crystal is formed as a bulk semiconductor.

15. A semiconductor ionizing radiation detecting apparatus, comprising:
   a. an ionizing electromagnetic radiation, neutron, and energetic charged particle detecting crystal, fitted with electrodes, with a voltage applied between the electrodes;
   b. the crystal being formed from elements in the group consisting of 1A-3A-Selenium and 1B-3A-Selenium in the stoichiometry I-III-VI$_2$ of the periodic table;
   c. means to convert current or charge pulses to a digital value;
   d. a computer to collect the digitized values; and
   e. means connected to the computer for displaying or recording the acquired data.

16. The ionizing radiation detecting apparatus of claim 15, wherein at least one of the elements forming the crystal is neutron sensitive and emits ionizing radiation subsequent to capturing a neutron.

17. The ionizing radiation detecting apparatus of claim 15, wherein the conducting electrodes are ohmic.

18. The ionizing radiation detecting apparatus of claim 15, wherein the conducting electrodes are Schottky.

19. The ionizing radiation detecting apparatus of claim 15, wherein the conducting electrodes are a combination of ohmic and Schottky.

20. The ionizing radiation detecting apparatus of claim 15, wherein the crystal is formed as a p-n device.

21. The ionizing radiation detecting apparatus of claim 15, wherein the crystal is formed as a p-i-n device.

22. The ionizing radiation detecting apparatus of claim 15, wherein the crystal is formed as a bulk semiconductor.

23. A semiconductor ionizing radiation detecting element, comprising:
   a. an ionizing electromagnetic radiation, neutron, and energetic charged particle detecting crystal, fitted with electrodes, with a voltage applied between the electrodes; and
   b. the crystal being formed from elements in the group consisting of 1A-3A-Sulfur and 1B-3A-Sulfur in the stoichiometry I-III-VI$_2$ of the periodic table.

24. A semiconductor ionizing radiation detecting element, comprising:
   a. an ionizing electromagnetic radiation, neutron, and energetic charged particle detecting crystal, fitted with electrodes, with a voltage applied between the electrodes; and
   b. the crystal being formed from elements in the group consisting of 1A-3A-Tellurium, 1B-3A-Tellurium in the stoichiometry I-III-VI$_2$ of the periodic table.

25. A semiconductor ionizing radiation detecting element, comprising:
   a. an ionizing electromagnetic radiation, neutron, and energetic charged particle detecting crystal, fitted with electrodes, with a voltage applied between the electrodes; and
   b. the crystal being formed from elements of 2B-4A-5A in the stoichiometry of II-IV-V$_2$ of the periodic table, wherein:
      i. 2B is selected from the group consisting of zinc, cadmium, and mercury;
      ii. 4A is selected from the group consisting of carbon, silicon, germanium, tin, and lead; and
      iii. 5A is selected from the group consisting of nitrogen, arsenic, antimony, and bismuth.

26. A semiconductor ionizing radiation detecting apparatus, comprising:
   a. an ionizing electromagnetic radiation, neutron, and energetic charged particle detecting crystal, fitted with electrodes, with a voltage applied between the electrodes; and
   b. the crystal being formed from elements of 2B-4A-5A in the stoichiometry of II-IV-V$_2$ of the periodic table, wherein:
      i. 2B is selected from the group consisting of zinc, cadmium, and mercury;
      ii. 4A is selected from the group consisting of carbon, silicon, germanium, tin, and lead; and
      iii. 5A is selected from the group consisting of nitrogen, arsenic, antimony, and bismuth;
   c. means to convert current or charge pulses to a digital value;
   d. a computer to collect the digitized values; and
   e. means connected to the computer for displaying or recording the acquired data.

27. A semiconductor ionizing radiation detecting element, comprising:
   a. an ionizing electromagnetic radiation, neutron, and energetic charged particle detecting crystal, fitted with electrodes, with a voltage applied between the electrodes; and
   b. the crystal being formed from elements of 2B-4A-5A in the stoichiometry of II-IV-V$_2$ of the periodic table, wherein:
      i. 2B is selected from the group consisting of zinc, cadmium, and mercury;
      ii. 4A is selected from the group consisting of carbon, silicon, germanium, and lead; and iii. 5A is selected from the group consisting of nitrogen, phosphorous, arsenic, antimony, and bismuth.

28. A semiconductor ionizing radiation detecting apparatus, comprising:
   a. an ionizing electromagnetic radiation, neutron, and energetic charged particle detecting crystal, fitted with electrodes, with a voltage applied between the electrodes; and
   b. the crystal being formed from elements of 2B-4A-5A in the stoichiometry of II-IV-$V_2$ of the periodic table, wherein:
      i. 2B is selected from the group consisting of zinc, cadmium, and mercury;
      ii. 4A is selected from the group consisting of carbon, silicon, germanium, and lead; and
      iii. 5A is selected from the group consisting of nitrogen, phosphorous, arsenic, antimony, and bismuth;
   c. means to convert current or charge pulses to a digital value;
   d. a computer to collect the digitized values; and
   e. means connected to the computer for displaying or recording the acquired data.

29. A semiconductor ionizing radiation detecting element, comprising:
   a. an ionizing electromagnetic radiation, neutron, and energetic charged particle detecting crystal, fitted with electrodes, with a voltage applied between the electrodes; and
   b. the crystal being formed from elements of 2B-4A-5A in the stoichiometry of II-IV-$V_2$ of the periodic table, wherein:
      i. 2B is selected from the group consisting of zinc and mercury;
      ii. 4A is selected from the group consisting of carbon, silicon, germanium, tin, and lead; and
      iii. 5A is selected from the group consisting of nitrogen, phosphorous, arsenic, antimony, and bismuth.

30. A semiconductor ionizing radiation detecting apparatus, comprising:
   a. an ionizing electromagnetic radiation, neutron, and energetic charged particle detecting crystal, fitted with electrodes, with a voltage applied between the electrodes; and
   b. the crystal being formed from elements of 2B-4A-5A in the stoichiometry of II-IV-$V_2$ of the periodic table, wherein:
      i. 2B is selected from the group consisting of zinc and mercury;
      ii. 4A is selected from the group consisting of carbon, silicon, germanium, tin, and lead; and
      iii. 5A is selected from the group consisting of nitrogen, phosphorous, arsenic, antimony, and bismuth;
   c. means to convert current or charge pulses to a digital value;
   d. a computer to collect the digitized values; and
   e. means connected to the computer for displaying or recording the acquired data.

* * * * *